United States Patent
Ng et al.

(10) Patent No.: US 7,715,146 B2
(45) Date of Patent: May 11, 2010

(54) SELF-CENTERING CLAMP

(75) Inventors: SiewMing Ng, Singapore (SG); Victor ChiSiang Choo, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 770 days.

(21) Appl. No.: 11/490,281

(22) Filed: Jul. 19, 2006

(65) Prior Publication Data

US 2008/0019039 A1   Jan. 24, 2008

(51) Int. Cl.
*G11B 17/028* (2006.01)
*G11B 25/04* (2006.01)

(52) U.S. Cl. .................................... 360/99.12
(58) Field of Classification Search ............. 360/99.12, 360/98.08
See application file for complete search history.

(56) References Cited

U.S. PATENT DOCUMENTS

| 5,243,481 | A  | * | 9/1993  | Dunckley et al. ....... 360/99.12 |
| 6,288,867 | B1 |   | 9/2001  | Jierapipatanakul et al. |
| 6,417,988 | B1 | * | 7/2002  | Renken et al. ............ 360/99.12 |
| 6,501,617 | B1 |   | 12/2002 | Harada et al. |
| 6,542,330 | B1 |   | 4/2003  | Choo et al. |
| 6,822,826 | B2 |   | 11/2004 | Choo et al. |
| 6,888,699 | B2 |   | 5/2005  | Drake et al. |
| 6,961,211 | B2 |   | 11/2005 | Takeda |
| 6,961,216 | B2 |   | 11/2005 | Chan et al. |
| 2003/0156354 | A1 | * | 8/2003 | Kim ......................... 360/99.12 |

* cited by examiner

*Primary Examiner*—Craig A. Renner
(74) *Attorney, Agent, or Firm*—Fellers, Snider, et al.

(57) ABSTRACT

An apparatus and associated method for clamping an article to a rotatable motor hub. A clamp has a web portion and a plurality of protuberant members extending away from the web portion. Distal ends of the protuberant members are radially disposable within a concentric ring to a clamp axis of rotation, the ring being sized for an interference fit with an outer diameter of the motor hub. The clamp is placed upon the motor so that the protuberant members contactingly engage the motor hub. Advancing a fastener moves the clamp axially to compressingly engage against the article, and resultingly moves the clamp radially to clearingly disengage the protuberant members from the motor hub.

16 Claims, 3 Drawing Sheets

SELF-CENTERING CLAMP

FIELD OF THE INVENTION

The embodiments of the present invention relate generally to the field of rotational alignment of mechanical fasteners and more particularly, but without limitation, to an apparatus and associated method for clamping a data storage medium to the rotational hub of a motor.

BACKGROUND

One type of moving storage data storage device is the disc drive, which has a data storage medium that is fixed in rotation with a motor. The storage medium is thus moved in a data transferring relationship with respect to a transducer. Because of demands for ever-faster access requirements, the speed at which the motor presents a desired sector of the disc to the transducer has evolved to extremely high speeds in relation to what was typical just a few years ago. Also because of demands for ever-greater storage capacity by disc drives of ever-smaller size, the density with which the data is stored to the storage medium has likewise increased exponentially. This increased storage density has made the disc drive designer pay more attention to the source of perturbations that interfere with the desired physical spacing between the storage medium and the transducer during the data transfer activities.

A compressive disc clamp has become a popular solution for fixing the storage medium in rotation with the motor. Generally, this type of clamp has one or more passages for fasteners to pass through and engage the motor. Advancing the fasteners compressingly engages the clamp against the storage medium.

It is very important that the clamp be aligned in rotation with the motor. Otherwise, a non-aligned condition creates unbalanced rotating mass, creating forces that can result in repeatable runout of the storage medium. This can cause fatal data transfer errors between the transducer and the storage medium.

Previous solutions that aligned a surface of a centrally-disposed opening in the clamp with an alignment feature of the motor are no longer feasible as the disc drive size is reduced. The centrally-disposed opening in the clamp is typically already present, as it is used for the fastener. However, it has been observed that as the inner diameter alignment surface is reduced, the error is magnified; that is, slight deflections that were negligible in the past now create out of tolerance conditions. Also, alignment features in the hub near the axis of rotation requires reducing wall thicknesses of the motor hub wall in ways that have been observed to diminish structural integrity beyond what is reliable.

What is needed is a way to align the clamp in relation to an outermost surface of the motor hub, thereby as far away as possible from the axis of rotation. What is also needed is a way of making the clamp self-aligning to the motor as the fastener(s) attach the clamp to the motor. It is to these improvements that the embodiments of the present invention are directed.

SUMMARY OF THE INVENTION

Embodiments of the present invention are generally directed to an apparatus and associated methodology for clamping an article to the rotatable hub of a motor.

In some embodiments a combination is provided of a motor hub and a clamp that is attachable to the motor hub. The clamp has a web portion and a plurality of protuberant members extending away from the web portion. Distal ends of the protuberant members are radially disposed within a concentric ring around a clamp axis of rotation, the ring being sized for an interference fit with an outer diameter of the motor hub.

In other embodiments a method is provided for fixing an article to a motor hub. The method includes providing a clamp having a plurality of protuberant members that are radially disposed within a concentric ring around a clamp axis of rotation. The ring is sized for an interference fit with an outer diameter of the motor hub. The method also includes placing the clamp on the motor hub so that the protuberant members contactingly engage the motor hub, and installing a fastener to fix the clamp in rotation with the motor hub.

In other embodiments a data storage device is provided having a motor for rotating a storage medium in a data transfer relationship with a transducer, and means for clamping the storage medium to the motor.

These and various other features and advantages which characterize embodiments of the claimed invention will become apparent upon reading the following detailed description and upon reviewing the associated drawings.

DETAILED DESCRIPTION

Figure 1:
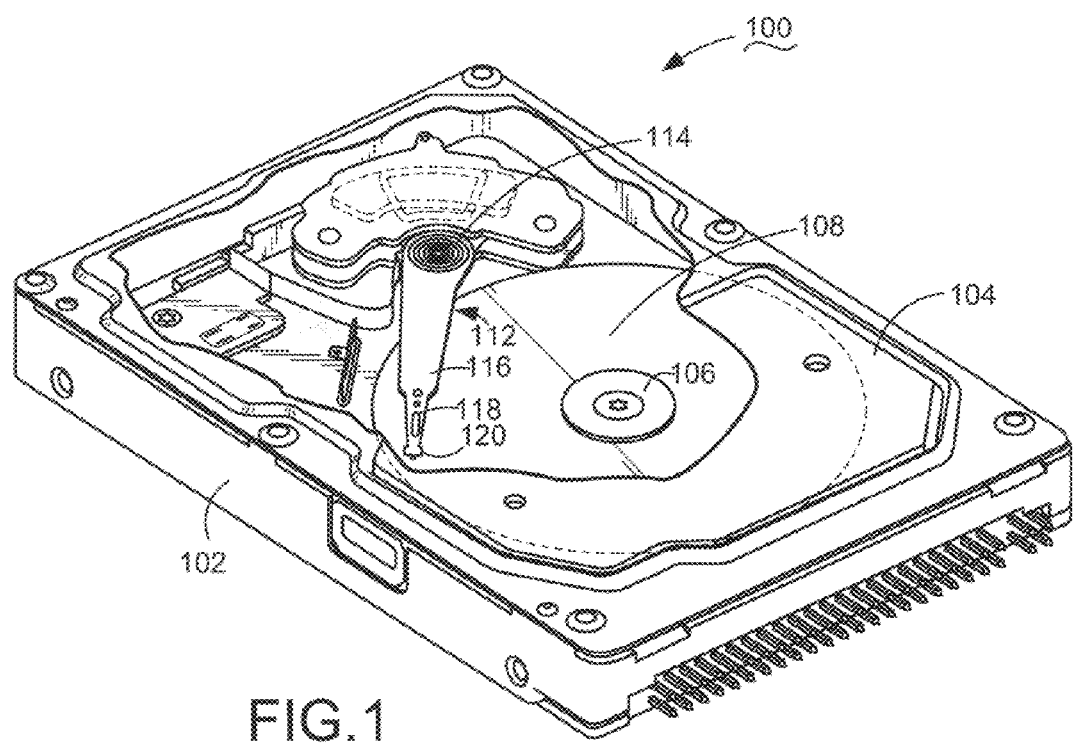
FIG. 1 is an isometric view of a data storage device constructed in accordance with embodiments of the present invention.

Referring to the drawings in general, and more particularly to FIG. 1 that shows an isometric view of a data storage device 100 constructed in accordance with embodiments of the present invention. The device 100 preferably includes a base 102 and a cover 104 (partially cutaway), which together provide a housing for a number of components. The components include a motor to which a clamp 106 is attached for fixing (meaning the same as "affixing" for purposes of this description and the appended claims) one or more storage mediums 108 in rotation therewith. Adjacent the storage medium 108 is an actuator assembly 112 that pivots around a bearing assembly 114. The actuator assembly 112 includes an actuator arm 116 supporting a load arm 118 that, in turn, supports a head 120 in a data transfer relationship with the adjacent storage medium 108. Each storage medium 108 can be divided into data tracks, and the head 120 is positioned to retrieve data from and store data to the tracks.

Figure 2:
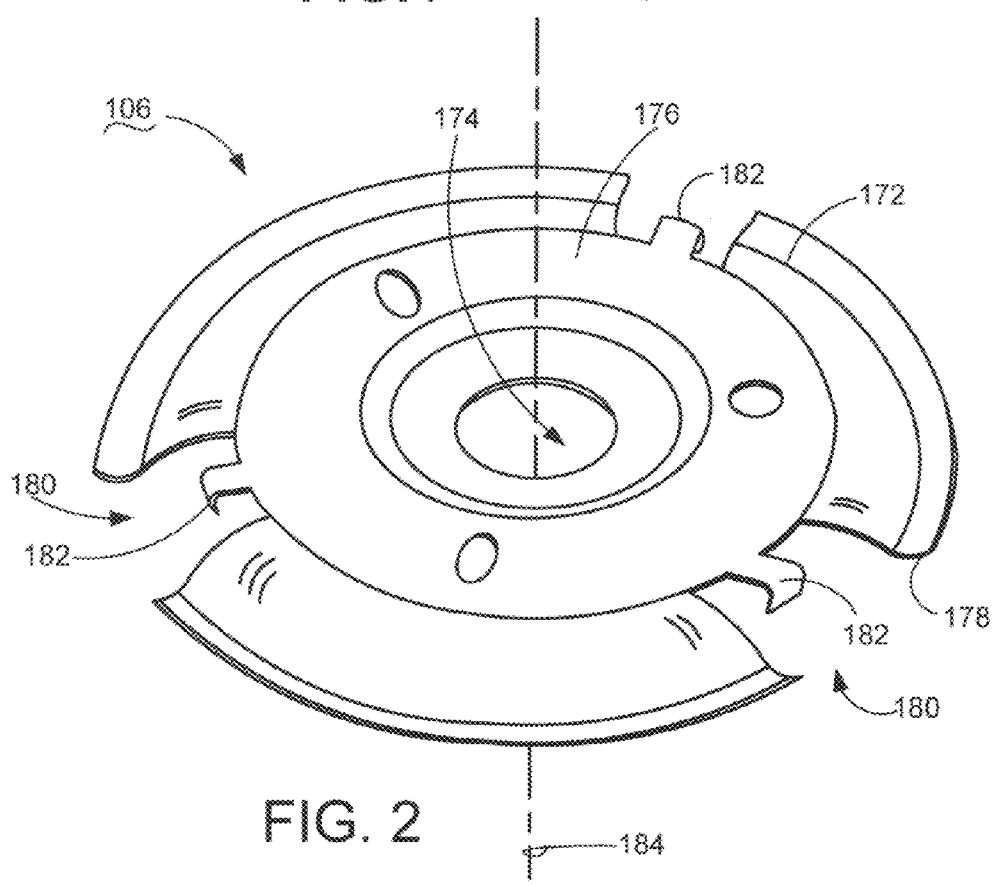
FIG. 2 is an isometric view of the disc clamp of the data storage device of FIG. 1.

FIG. 2 is an isometric view of an illustrative clamp 106 that is constructed in accordance with embodiments of the present invention. The clamp 106 generally has an annular web 172 defining a centrally-disposed opening 174 for passing a fastener therethrough to engage the rotatable motor hub (see motor hub 194 in FIG. 3 discussed below). The web 172 has a centrally-disposed abutment portion 176 against which a shoulder portion of the fastener (see fastener 190 in FIG. 3 discussed below) operably seats to abuttingly engage the clamp 106 against the motor hub 194 and thereby fixingly engage the clamp 106 in rotation with the motor hub 194. The web 172 extends from the abutment portion 176 to define a frusto-conical spring, so that an axial displacement of the abutment portion 176 toward the motor hub 194, as in when attaching the clamp 106, results in a radial displacement of other portions of the web 172. This radial displacement is discussed in more detail below.

A peripheral portion of the web 172 defines a contact rib 178 directed toward and thereby operably compressingly engaging against the storage medium 108 in order to fix it in rotation with the motor hub. Openings 180 in the peripheral portion have disposed therein each of a plurality of protuberant members 182 extending away from the planar surface 176. Distal ends of the protuberant members 182 are radially disposed within a concentric ring around the clamp axis of rotation 184. In an unclamped mode of the clamp 106, as shown in FIG. 2 (and FIG. 4 below), the distal ends of the protuberant members 182 are radially disposed in a ring that is sized for an interference fit with an outer diameter of the motor hub. The illustrative embodiments of FIG. 2 have three protuberant members 182 equally spaced at 120 degrees apart. In alternative equivalent embodiments more protuberant members 182 can be used. In any event, preferably the features of the clamp 106 and the frusto-conical shape are well-suited for manufacturing the clamp 106 by a stamping process.

Figure 3:
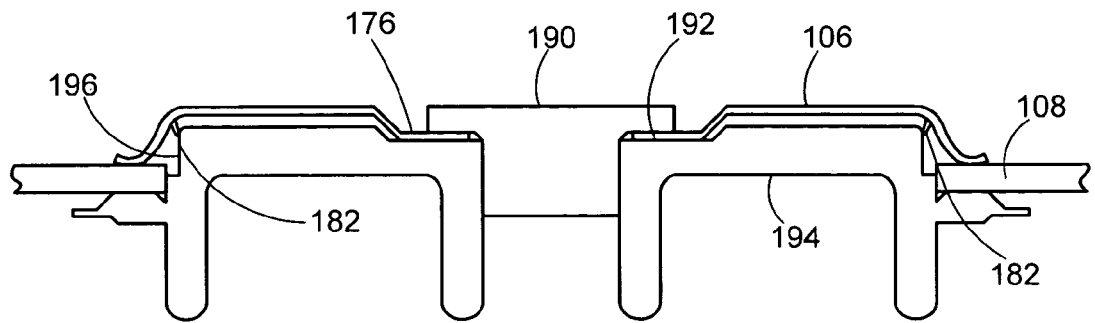
FIG. 3 is an elevational view of the disc clamp of FIG. 2 attached to the motor hub in the clamped mode.

FIG. 3 is an elevational view of the clamp 106 in the clamped mode. By the "clamped mode" it is meant that a predetermined fastening force has been applied to fix the clamp 106 against the storage medium 108, so as to fix them together in rotation. In the illustrative embodiments of FIG. 3 a fastener 190, such as a threaded fastener, has been advanced against the abutment portion 176 to contactingly engage a contacting surface of the abutment portion 176 against a surface 192 of the motor hub 194. In the clamped mode of FIG. 3 it will be noted that the protuberant members 182 are disposed adjacent an outer diameter 196 formed in the motor hub 194, around which the storage medium 108 is disposed.

Figure 4:
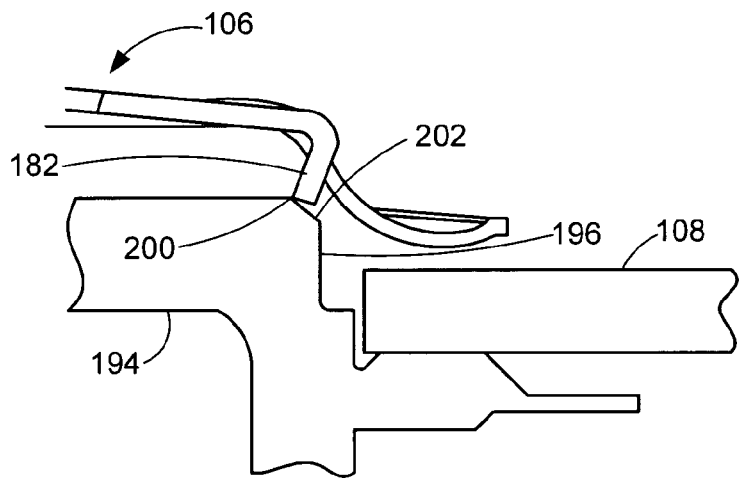
FIG. 4 is an enlarged elevational view of the clamp in the unclamped mode.
Figure 5:
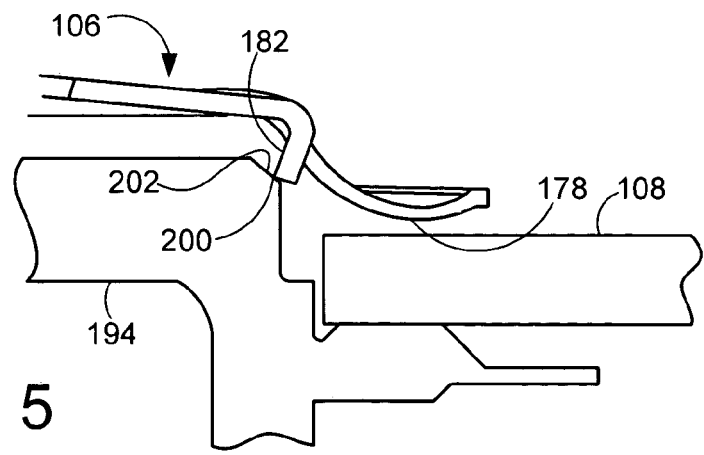
FIG. 5 is a view similar to FIG. 5 but with the fastener partially advanced.
Figure 6:
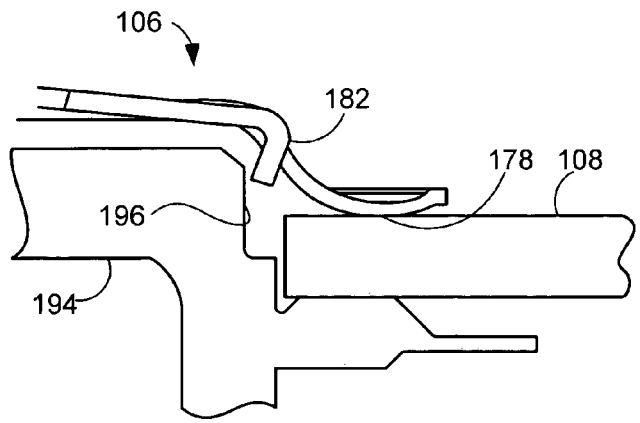
FIG. 6 is a view similar to FIG. 5 but in the clamped mode.

FIGS. 4-6 illustrate the manner in which the clamp 106 self-centers around the motor hub 194 during installation. FIG. 4 illustrates the unclamped mode, that is, the arrangement at the time when the clamp 106 is placed to the motor hub 194. This view better illustrates the manner in which the distal ends of the protuberant members 182 (only one shown) are disposed radially within a ring that is sized to provide an interference fit with the outer diameter 196 of the motor hub 194. For example, in successful trials of the present embodiments an interference fit of 0.1 millimeters was employed. Preferably, the distal end of the protuberant member 182 is formed so as to produce a point contact 200 with the motor hub 194. In these illustrative embodiments the motor hub 194 has a chamfered surface 202 to receivingly engage the point contact 200 of the protuberant member 182.

FIG. 5 illustrates the manner that the protuberant member 182 is displaced radially outward from the motor hub 194 as a result of advancing the fastener 190 (FIG. 3) during a transitional phase of the installation between the unclamped mode of FIG. 4 and the clamped mode of FIG. 3 (and FIG. 6 below). By configuring the point contact 200 against the chamfered surface 202, the plurality of protuberant members 182 will seek to an aligned position with respect to the motor hub 194 by an equalization of the forces, both radial and axial forces, experienced by the protuberant members 182.

FIG. 6 illustrates the final clamped mode whereat the fastener 190 (FIG. 3) has been advanced to provide a predetermined fastening force against the clamp 106. The clamp 106 by its frusto-conical spring configuration will, in turn, pressingly engage the rib 178 against the storage medium 108 to fix it in rotation with the motor hub 194. Note that in the clamped mode the protuberant member 182 has been displaced radially enough that it clearingly disengages the motor hub 194. That is, the axial force by the fastener 190 effects a radial force against the rib 178 that maintains a separation between the protuberant member 182 and the outer diameter 196. Advantageously, this mechanically disconnects the protuberant members 182 from the motor hub 194, making resonance determinations more predictable and reliable. It also eliminates potential sources of failure, such as noise or debris that can likely result from the protuberant members 182 being in operable contact with the motor hub 194.

Figure 7:
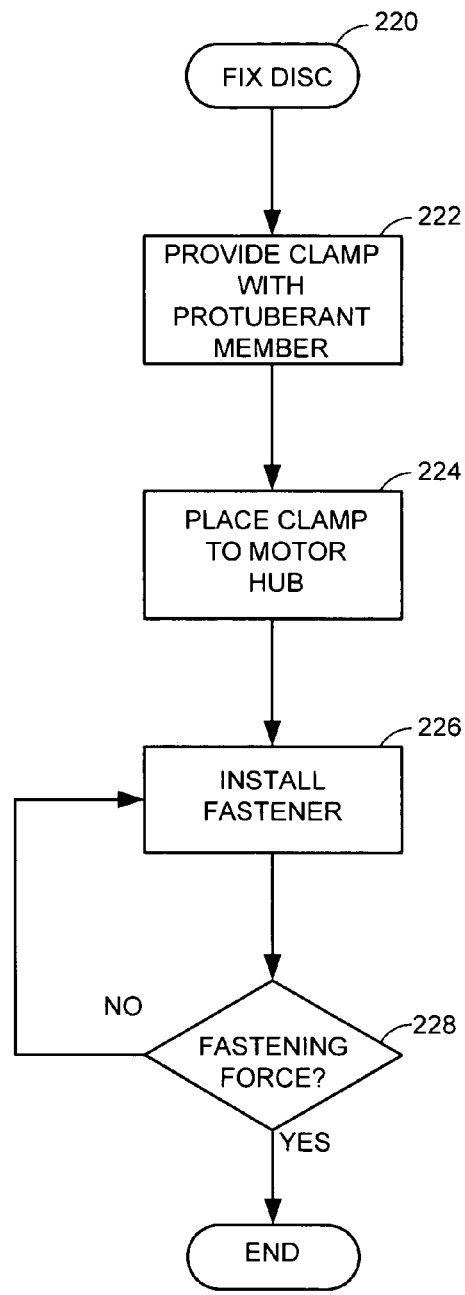
FIG. 7 is a flowchart illustrating steps for practicing a method of FIXING AN ARTICLE TO A MOTOR in accordance with embodiments of the present invention.

FIG. 7 is a flowchart of illustrative steps for performing a method 220 of FIXING AN ARTICLE TO A MOTOR HUB in accordance with embodiments of the present invention. The method 220 begins in block 222 with providing a clamp having protuberant members sized for an interference fit with an outer diameter of the motor hub. Preferably, the protuberant members provide for a point-contact engagement against a chamfered surface of the motor hub. Also preferably, the clamp can be provided by a manufacturing method of stamping.

Control then passes to block 224 where the clamp is placed onto the motor hub, such that the protuberant members contactingly engage the chamfered end of the motor hub in a point-contacting engagement. In block 226 the fastener is passed through the clamp to engage the motor hub. The fastener is then advanced axially, thereby advancing an inner portion of the clamp toward the motor hub, and causing the protuberant members to displace radially away from the motor hub. The protuberant members slidingly engage against the respective chamfered surfaces as the fastener is progressively advanced. The clamp has freedom of movement to displace radially in order to equalize the resultant forces experienced by all of the protuberant members, thereby self-centering the clamp with respect to the motor hub.

In decision block 228 it is determined whether a preselected fastening force has been applied to the fastener. If the determination is no, then control returns to block 226 and advancement of the fastener continues. Otherwise, the fastener is fully installed ("clamped mode") and the method ends. It will be noted that upon reaching the clamped mode the protuberant members clearingly disengage the motor hub.

As described generally, illustrative embodiments of the present invention contemplate a data storage device having a motor for rotating a storage medium in a data transfer relationship with a transducer, and means for clamping the storage medium to the motor. As described, the term "means for clamping" includes the use of a clamp with protuberant members that align an outer surface of the clamp with an outer surface of motor hub. The "means for clamping" can be advantageously characterized by alignment surfaces that are in contacting engagement in an unclamped mode, and that clearingly disengage in a clamped mode. For purposes of this description and meaning of the appended claims, the term "means for clamping" expressly does not encompass previous attempted solutions that involve an inner surface of the clamp contactingly engaging the motor hub, or surfaces of the clamp that remain contactingly engaged with the motor hub after alignment is achieved.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the devices in which they are incorporated or the particular environment in which they are used without departing from the spirit and scope of the present invention.

In addition, although the illustrative embodiments described herein are directed to a data storage system, it will be appreciated by those skilled in the art that the claimed subject matter is not so limited and various other electronic devices can utilize the embodiments of the present invention without departing from the spirit and scope of the claimed invention.

What is claimed is:

1. In combination:
   a hub; and
   a clamp attachable to the hub to operably affix an article and the hub in rotation together, the clamp comprising:
      a web defining an abutment portion and a contact rib portion; and
      a plurality of protuberant members extending away from the web, substantially coplanar distal ends of the protuberant members disposed along a path defining a size that is smaller than an operable mating size of the hub when the abutment portion is clearingly disengaged from the hub, and the web characteristically shaped to translate longitudinal movement of the abutment portion toward the hub into radial movement of the protuberant members when the protuberant members operably contact the hub so that a force applied to abuttingly engage the abutment portion against the hub is transferred through the web to simultaneously move the contact rib portion longitudinally to an operable contacting engagement against the article and to move each of the protuberant members radially to an operable non-contacting disengagement from the hub.

2. The combination of claim 1 wherein the distal ends of the protuberant members are each configured to make a point contact with the hub.

3. The combination of claim 1 wherein the web is frusto-conical.

4. The combination of claim 1 wherein the force contactingly engages a planar surface of the abutment portion against a mating planar surface of the hub.

5. The combination of claim 1 wherein the clamp defines a central opening for passing a fastener for applying the force.

6. The combination of claim 1 wherein the clamp is made by a process of stamping.

7. The combination clamp of claim 1 wherein the protuberant members are disposed along a circular path defining a diameter that is smaller than an outer diameter of the hub.

8. A data storage device, comprising:
   a motor and a storage medium operably affixable together in rotation to present the storage medium in a data transfer relationship with respect to a transducer; and
   means for clamping the storage medium to the motor by contactingly engaging an alignment portion of a clamp against a reference surface of the motor to align the clamp with the motor and subsequently clearingly disengaging the alignment portion of the clamp from the reference surface of the motor as a result of attaching the clamp to the motor and thereby affixing the motor and the storage medium together in rotation.

9. A method for operably affixing an article and a hub in rotation together, comprising:
   providing a clamp having a contact rib and a web portion with a plurality of protuberant members extending away from the web portion that are radially disposable within a concentric ring around a hub axis of rotation, the ring sized to produce an interference fit between the plurality of protuberant members and an outer diameter of the hub;
   placing the clamp on the hub so that the protuberant members contactingly engage the hub and so that the contact rib clearingly disengages the article; and
   installing a fastener that urges the contact rib operably in contacting engagement against the article and urges each of the protuberant members operably in non-contacting disengagement from the hub to affix the clamp and the article in rotation with the hub.

10. The method of claim 9 wherein the placing step is characterized by contactingly engaging the protuberant members against a chamfered edge of a distal end of the hub.

11. The method of claim 10 wherein the installing step is characterized by advancing an inner portion of the clamp toward the hub, causing the protuberant members to displace radially away from the hub.

12. The method of claim 11 wherein the installing step is characterized by the protuberant members slidingly engaging the chamfered surface as the fastener is progressively advanced to affixingly engage the clamp to the hub.

13. The method of claim 12 wherein the installing step is characterized by the protuberant members non-contactingly disengaging the hub at a predetermined fastening force provided by the fastener.

14. The method of claim 12 wherein the installing step is characterized by the protuberant members each making point contact with the chamfered surface.

15. The method of claim 13 wherein the installing step is characterized by installing a single fastener at the center of the clamp.

16. The method of claim 11 wherein the providing step is characterized by the clamp being made by a process of stamping.

* * * * *